(No Model.) 3 Sheets—Sheet 2.
J. H. & P. LUX & S. EDE.
J. H. Lux Administrator of P. Lux, deceased.
HAY RAKER AND LOADER.
No. 380,336. Patented Apr. 3, 1888.
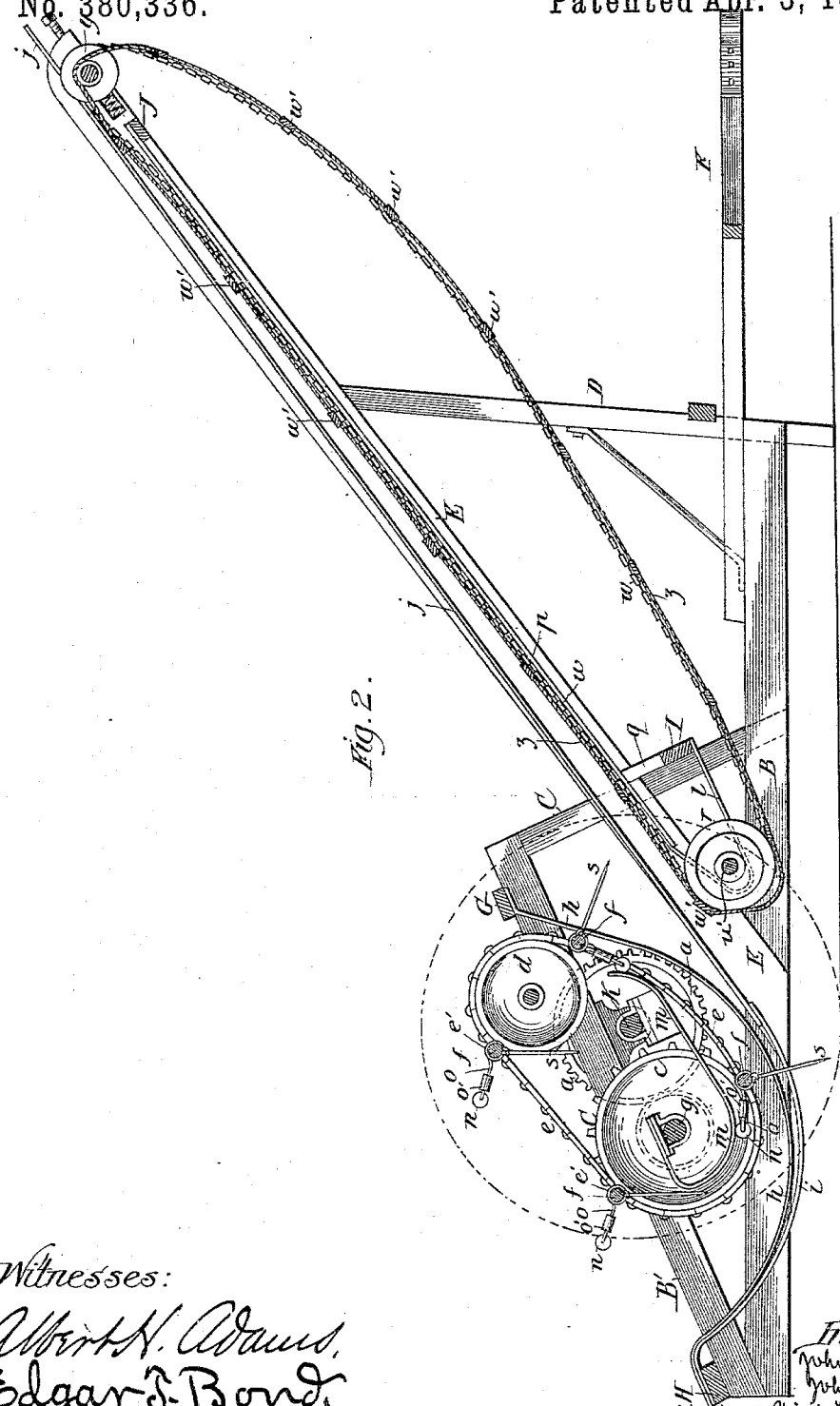
Witnesses:
Albert N. Adams,
Edgar F. Bond.
Inventors:
John H. Lux,
John H. Lux, Administrator of Philip Lux, deceased.
Samuel Ede
by West & Bond
Attys.

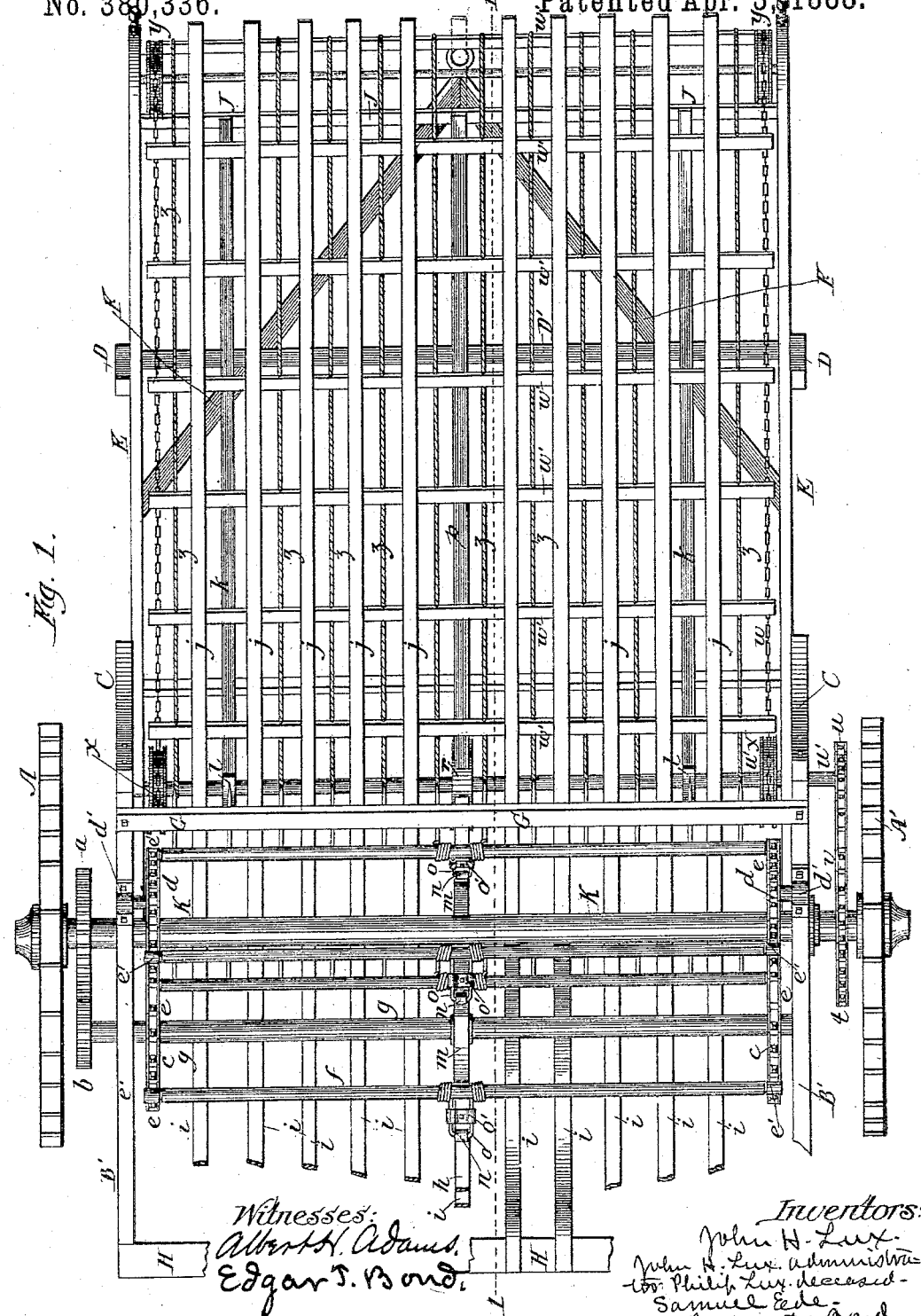

(No Model.) 3 Sheets—Sheet 3.
J. H. & P. LUX & S. EDE.
J. H. Lux Administrator of P. Lux, deceased.
HAY RAKER AND LOADER.
No. 380,336. Patented Apr. 3, 1888.
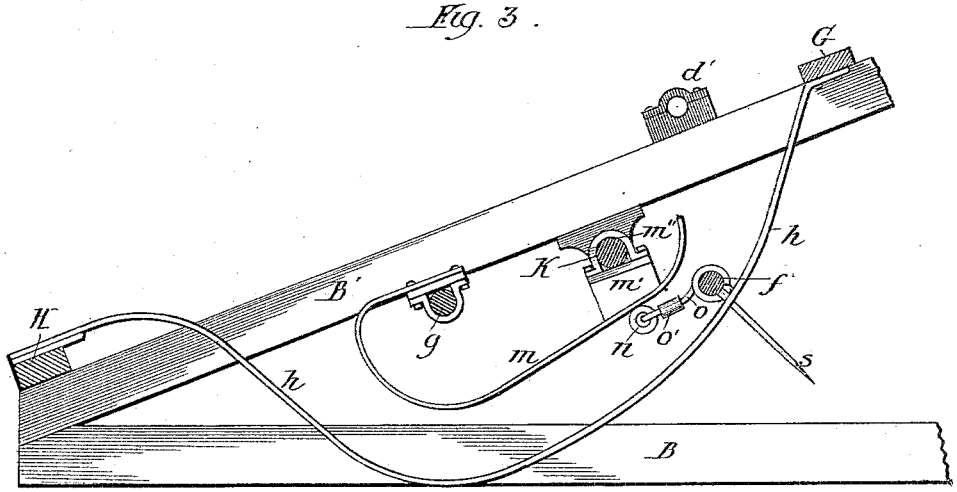
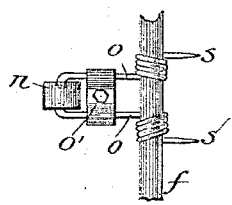
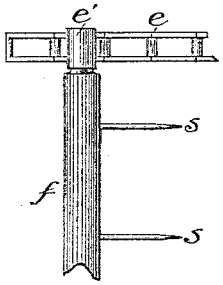
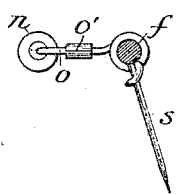

UNITED STATES PATENT OFFICE.

JOHN H. LUX (FOR HIMSELF AND AS ADMINISTRATOR OF PHILIP LUX, DECEASED) AND SAMUEL EDE, OF EARLVILLE, IOWA.

HAY RAKER AND LOADER.

SPECIFICATION forming part of Letters Patent No. 380,336, dated April 3, 1888.

Application filed January 30, 1886. Serial No. 190,347. (No model.)

*To all whom it may concern:*

Be it known that we, JOHN H. LUX (for himself and PHILIP LUX, deceased) and SAMUEL EDE, residing at Earlville, in the county of Delaware and State of Iowa, citizens of the United States, have invented a new and useful Improvement in Hay Rakers and Loaders, of which the following is a full description, reference being had to the accompanying drawings, in which—

Figure 1 is a top or plan view; Fig. 2, a longitudinal vertical section on line 1 1 of Fig. 1; Fig. 3, an enlarged section showing the devices for operating the rake-teeth; Fig. 4, an enlarged detail of the turning roller attached to the rake-head; Fig. 5, a detail of the attachment of the rake-head to the chain; Fig. 6, a side elevation of Fig. 4, with the rake-head in section; Fig. 7, a detail of the locking-plate of the roller-support.

This invention relates to a hay-loader of the class shown in Patent No. 322,836, dated July 21, 1885, and has for its object to simplify the construction and improve the operation of the parts pertaining to the operation of a combined hay rake and loader; and it consists in the parts and combinations of parts hereinafter described and claimed as new.

In the drawings, A A' represent the supporting and driving wheels; B B', the lower or main frame; C, the brace-bars for the frame B B'; D, supporting posts or braces; E, side boards; F, draw-bar; G, H, and I, cross-bars of the framing; J, cross-bar for the upper end of the side pieces, E; K, axle; $a\,b$, gear-wheels; $c\,d$, sprocket-wheels; $e$, drive-chains having tubular links $e'$; $f$, rake heads or shafts; $g$, shaft; $h$, a guard or support for the rake-head; $i\,j$, yielding cover slats or bars; $k$, supporting-bars for the elevator; $l$, spring or yielding supports for the lower ends of the bars $k$; $m$, eccentric-bar for operating the rake-teeth; $n$, roller for turning the rake-head $f$; $o$, spring-support for attaching the roller $n$; $o'$, clasp for holding the support against spreading; $p$, central supporting-bar for the elevator; $q$, post or support for lower end of $p$; $r$, guide-wheel for the elevator; $s$, rake-teeth; $t\,u$, sprocket-wheels; $u'$, shaft; $v$, drive-chain; $w$, chain; $w'$, cross-bars; $x\,y$, grooved pulleys; $z$, cords connected with the elevator cross-bars $w'$.

The main frame B B' is made of a triangular form, as shown in Fig. 2, and its forward end, as shown, is supported by the brace or inclined post C. The side pieces, E, of the elevator are of board or other material and sufficiently wide to form a guard for the hay. Each side piece, E, of the elevator-frame is supported upon the frame B by a brace or post, D, which post may have additional braces, as shown at Fig. 2, and as there shown the posts D are extended downward, so that when the machine is detached and lowered it will rest upon their lower ends, and as shown these side boards, E, are extended down, so as to form braces for the framing in addition to their use in preventing hay which is being elevated from working out at the sides.

The shaft $g$ is mounted upon the under sides of the bars B' by suitable bearings, and it projects beyond the frame on one side so as to receive the gear-wheel $b$, and on this shaft the sprocket-wheels $c$ are mounted, which wheels are of sufficient size to prevent the rake-teeth $s$ from coming in contact with the shaft in passing. Their diameter, therefore, may be regulated by the desired length of the rake-teeth.

On the upper side of the bars and in front of the axle K, as shown in Fig. 2, are mounted sprocket-wheels $d$, which sprocket-wheels may be furnished with spindles running in boxes $d'$ on the upper side of the bars B'; or by providing these sprockets with hubs the spindles may be permanently mounted in place of the boxes $d'$. In one construction the spindle will rotate with the wheel; in the other the wheel will rotate upon it.

The sprocket-wheels $c\,d$ are connected with the driving-chain $e$, which chain is provided with the tubular links $e'$, in which the ends of the rake-heads are journaled, so as to turn freely. At or near the middle of the shaft K is suspended an eccentric guide, $m$, which turns the rake-teeth into position as they descend, and holds them in a raking and comparatively-rigid position until they pass the lower end of the elevator, when they are again free to turn, and in turning be drawn out from the hay vertically and pass around freely until they again come in contact with the guide $m$. The eccentric guide $m$ is suspended from the shaft K by a block, *m'*, and stirrups *m''*, the stirrups passing around the shaft and having the block *m'* attached to their ends, and the guide being firmly secured to the block.

The operation of turning the rake-head is performed by means of a roller, *n*, mounted upon the middle of each rake-head *f*. As shown in Fig. 4, this roller *n* is mounted between the ends of a support, *o*, and, as shown, the attached end of the support is coiled around the shaft or rake-head *f*, and is held in place by its end being looped, so as to pass around a tooth, *s*, and be held in position thereby. This construction necessitates the inserting of the teeth after the spring-support is in place. As shown in Figs. 4 and 6, the spring-support is made of two pieces of wire, and a clamping cap-plate, *o'*, is provided to hold the extended ends of the support firmly against spreading, and also to furnish additional strength to the support at the roller end. The clamping-plate *o'* is shown in Fig. 7, and by the use of this plate the roller *n* may be readily applied, both originally and for purposes of repair.

The raking part of the machine is driven by the wheel A, while the elevator is driven by the wheel A', which is provided with a sprocket-wheel, *t*, as shown in Fig. 1, which operates the sprocket-wheel *u* by means of the drive-chain *v*. The sprocket-wheel *u* is mounted upon a shaft, *u'*, which carries and drives the grooved pulleys *x*. The chains *w* are mounted upon these pulleys and pass around corresponding pulleys, *y*, which, as shown, are carried upon a shaft supported at the ends in the side pieces, E. Elevating cross-bars *w'* are attached to the chains *w*, and these cross-bars are connected together by cords or ropes *z*, which are sufficiently near together to prevent the gathered hay from falling through while being elevated. A backing of thin boards may be used, and in this event the cords *z* will not be necessary; but the cords are preferred to the boards, as they are equally efficient and are more easily applied, and make a lighter elevator.

When the elevator is in operation, the bars *w'* would be liable to sag, and this is prevented at the ends by the bars *k*, which bars at their front ends are attached to the cross-bar J and at their lower ends to bars or metal plates *l*, which plates are attached to the bar I, as shown in Fig. 2. By this means the elevator is given a support and is prevented from sagging in use. Two of these bars *k* are shown, one in each side of the elevator; but two or more may be used. A central supporting-bar, *p*, is provided, the upper end of which is attached to the cross-bar J and the lower end to a post or upright, *q*, running up from the cross-bar I. A wheel, *r*, is secured on the shaft *u'* midway between the wheels *x* to support the cross-seats *w'* in turning at the lower end of the elevator, and, as shown, this wheel *r* and the bar *p* are in line. The passing hay is held down upon the elevator by means of the covering-slats *j*, which press lightly upon the hay, and thus insure the action of the cross-bars *w'*. These bars rest loosely upon the elevator at their upper ends. At their lower ends they are attached to yielding or spring bars *i*, so that their lower ends may rise or fall to accommodate the quantity of hay passing.

The yielding bars *i* are permanently attached to the cross-bar H, and extend forward and beneath the line of travel of the teeth *s*. The bar *h* is non-yielding, and is attached to the cross-bar G at its front end and to the bar H at its rear end. By the arrangement of the bars *i* the raking part of the device is made to operate freely with light or heavy hay and to deliver it to the elevator in such manner as to insure its being received upon the elevating apparatus, as such bars act as strippers for the rake-teeth, and also serve as a guard against the passing of the hay to interfere with the operation of the teeth. The bar *h* is located at the center of the machine transversely, and forms a rest and guide for the rake heads or shaft in case the chains run loose, and also to act to pass the rake-heads around at the upper end of their travel.

This machine is attached to the rear end of a wagon or cart by the loop or hook at the end of the bar F, which will lift it sufficiently to prevent the lower ends of the posts D from coming in contact with the ground. It is thus drawn along behind the wagon, and its operation in use will be apparent from the description, and, briefly, is as follows:

The advance of the machine through the wheel A operates the rakes by the wheel *a* driving the wheel *b* and rotating the shaft *g*, and such rotation of the shaft through the sprocket-wheels *c d* and chains *e* drives the rake-heads, and at the same time the wheel A', through the wheels *t u*, chain *v*, shaft *u'*, and wheels *x y*, drives the chains *w*, operating the elevator.

The rake-teeth *s* as they sweep over the ground gather the hay and carry it forward, to be deposited thereby on the lower end of the elevator, to be elevated onto a wagon or other depository. The rake-heads, with their teeth, are carried around by the travel of the chains *e*, and by the guide *m* and roller *n* are thrown down in succession to gather and advance the hay, and the travel of the rake-heads is an elliptical one, by which the requisite length of travel is given to present the teeth in working position and keep them clear on withdrawal, and the teeth are presented into position for use by the rocking movement of the rake-head, which turns in the bearings *e'* on the driving-chains.

The roller *n* is inserted in the support when made in two parts by springing apart the outer ends of the support and dropping the roller *n* in place, and the roller is held in place by the clasp *o*. The support could be made of a single continuous wire bent into shape, in which case the roller would be slipped into position before bending the wire.

What we claim as new, and desire to secure by Letters Patent, is—

1. The combination of the gear-wheels $a\ b$, sprocket-wheels $c\ d$, chains $e$, revolving rake-heads $f$, journaled in said chains and provided with rake-teeth $s$, the turning rollers $n$, having spring-shanks $o$ attached to the rake-heads, and the eccentric guide $m$, substantially as described.

2. The cover-slats $j$, having the yielding or spring extensions $i$ and their upper ends free, in combination with an elevator, the guide $h$, and the elliptically-revolving rakes $f\ s$, substantially as described.

3. The combination of the rakes, the cover-slats $i\ j$, having their upper ends free and extending in rear of the rakes, and the elevator $w\ w'$, substantially as described.

4. The supporting-bars $k$ and elastic bars $l$, having the lower ends of said bars secured thereto, in combination with the revolving elevator $w\ w'$, substantially as described.

5. The combination of the longitudinal slats or bars $i\ j$, cross-slats $w'$ of the elevator-chain, the longitudinal supporting-bar $p$, located below the upper surface of the elevator about the middle thereof, and the bars $k$ at the sides, the shaft $u'$ at the lower end of the elevator, and the disk $r$, located on said shaft in line with the bar $p$, substantially as described.

6. The combination of the rake-head $f$, spring-shank $o$, connected to said rake-head, clamping-plate $o'$, connecting the two arms of said shank, the roller $n$, carried by said shank, the eccentric guide $m$, and the guide-bar $h$, substantially as described.

7. The combination and arrangement of the elliptically-moving rakes having the shank $o$, and the guide $m$, and guide-bar $h$, with cover-bars composed of the elastic bars $i$, extended forward and beneath the line of travel of the rake-teeth, and the bars $j$, secured thereto and extended lengthwise of the carrier, revolving elevator $w\ w'$, and supporting-bars $k$, substantially as described.

JOHN H. LUX.
JOHN H. LUX,
*Administrator of the estate of Philip Lux, deceased.*

SAMUEL EDE.

Witnesses to the signature of John H. Lux for himself and as administrator of the estate of Philip Lux, deceased:
ALBERT H. ADAMS,
HARRY T. JONES.

Witnesses to the signature of Samuel Ede:
SAMUEL W. KLAUS,
FRED LUCKINBILL.